US012073530B1

(12) United States Patent
Ng-Thow-Hing

(10) Patent No.: US 12,073,530 B1
(45) Date of Patent: Aug. 27, 2024

(54) 3D REPRESENTATION ADJUSTMENTS FOR COMMUNICATION SESSIONS

(71) Applicant: Apple Inc., Cupertino, CA (US)

(72) Inventor: Victor Ng-Thow-Hing, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/369,284

(22) Filed: Sep. 18, 2023

Related U.S. Application Data

(60) Provisional application No. 63/409,364, filed on Sep. 23, 2022.

(51) Int. Cl.
 *G06T 19/20* (2011.01)
 *G06F 3/01* (2006.01)
 *G06T 7/70* (2017.01)
 *G06T 19/00* (2011.01)

(52) U.S. Cl.
 CPC .............. *G06T 19/20* (2013.01); *G06F 3/012* (2013.01); *G06F 3/013* (2013.01); *G06T 7/70* (2017.01); *G06T 19/006* (2013.01); *G06T 2207/30196* (2013.01); *G06T 2219/024* (2013.01); *G06T 2219/2004* (2013.01)

(58) Field of Classification Search
 USPC ......................................................... 345/156
 See application file for complete search history.

(56) References Cited

U.S. PATENT DOCUMENTS

| | | | |
|---|---|---|---|
| 6,677,980 B1 | 1/2004 | Jeon | |
| 6,806,898 B1 | 10/2004 | Toyama et al. | |
| 11,675,195 B2 * | 6/2023 | Jakubzak | G06T 13/40 |
| | | | 345/8 |
| 2018/0095276 A1 * | 4/2018 | Ng-Thow-Hing | |
| | | | G06F 3/04812 |
| 2019/0354175 A1 * | 11/2019 | Torkos | G06F 3/013 |
| 2019/0362546 A1 * | 11/2019 | Wayenberg | G06T 17/20 |
| 2021/0407180 A1 * | 12/2021 | Wang | G06T 19/20 |
| 2022/0030216 A1 * | 1/2022 | Tsai | H04N 13/344 |
| 2022/0101613 A1 * | 3/2022 | Rockel | G06F 3/011 |
| 2022/0269333 A1 | 8/2022 | Dedonato et al. | |
| 2022/0366649 A1 * | 11/2022 | Zang | G06T 7/344 |

(Continued)

FOREIGN PATENT DOCUMENTS

| | | |
|---|---|---|
| WO | 2012/135545 A1 | 10/2012 |
| WO | 2021/062278 A1 | 4/2021 |

*Primary Examiner* — Chineyere D Wills-Burns
(74) *Attorney, Agent, or Firm* — Thompson HIne LLP

(57) ABSTRACT

Various implementations disclosed herein include devices, systems, and methods that provide a view of an adjusted position of a three-dimensional (3D) representation of another user (e.g., an avatar) during a communication session. At a first device, 3D representation data corresponding to at least a portion of a second user of a second device (e.g., a sender) is obtained during a communication session. Offset information (e.g., a vertical offset value) corresponding to an offset between a camera viewpoint position and an eye viewpoint position associated with the second device is obtained. A position of a first portion of a 3D representation of the second user (e.g., head and torso) is adjusted relative to a 3D environment associated with the first device. A view that includes the first portion of the 3D representation of the second user in the 3D environment is provided during the communication session.

25 Claims, 12 Drawing Sheets

(56) References Cited

U.S. PATENT DOCUMENTS

2023/0394746 A1* 12/2023 Kang .................... G06T 15/205
2024/0015264 A1*  1/2024 Manzanera Lidón .. G06T 9/001

* cited by examiner

3D REPRESENTATION ADJUSTMENTS FOR COMMUNICATION SESSIONS

CROSS-REFERENCE TO RELATED APPLICATIONS

This application claims the benefit of U.S. Provisional Application Ser. No. 63/409,364 filed Sep. 23, 2022, which is incorporated herein in its entirety.

TECHNICAL FIELD

The present disclosure generally relates to electronic devices that use sensors to provide views during communication sessions, including views that include representations of one or more of the users participating in the sessions.

BACKGROUND

Various techniques are used to represent the participants of communication sessions such as video conferences, interactive gaming sessions, and other interactive social experiences. For example, the participants may see realistic or unrealistic representations of the users (e.g., avatars) participating in the sessions. It may be desirable for the user representations to be repositioned in order to improve eye contact during the communication sessions.

SUMMARY

Various implementations disclosed herein include devices, systems, and methods that display a 3D representation (e.g., an avatar) at a first device (e.g., a receiving device) from a second device (e.g., a sending device) of another user (i.e., a sender) during a copresence communication session. For example, a copresence communication session may generally refer to two (or more) users communicating with each other via respective avatars while wearing a head mounted device (HMD). The receiving device may display the 3D representation of the other user based on 3D representation data received from the sending device.

In some implementations, the 3D representation data may be based on eye capture data of the sender's eyes. However, this eye capture data is captured when the sender is looking at a passthrough video-based environment in which there is an offset between the camera position of the passthrough video and the sender's actual viewpoint, e.g., a vertical offset. Thus, the eye capture data may result in the receiving device displaying an avatar having eyes that appear to be looking at something other than what the eyes are actually looking at. In a face-to-face copresence encounter, this offset can result in an eye-contact mismatch in which the displayed avatar eyes appear to be looking above the receiver's eyes rather than at the receiver's eyes.

In some techniques described herein, the offset between a viewer's viewpoint position and a camera's viewpoint position may be accounted for by adjusting a position of and/or orienting the 3D representation so that the eyes will appear to be looking at what the eyes are actually looking at (e.g., for direct eye contact during the session). For example, the receiver may display the 3D representation at a lower position and/or tilt the 3D representation slightly upward so that the 3D representation appears to the receiver to be looking in the receiver's eyes, as intended. In some implementations, the receiving device may adjust only a portion of the 3D representation, e.g., not adjusting hand positions so that the avatar's hands are perceived correctly. Additionally, or alternatively, a visual treatment may be used to hide any visual gaps (e.g., if the users are trying to virtually touch each other's hand/finger). In some implementations, the offset that is used to reposition the 3D representation (avatar) may be subject specific, i.e., based on sender actual eye position relative to the camera position.

In general, one innovative aspect of the subject matter described in this specification can be embodied in methods, at a first device associated with a first user and including one or more processors, that include the actions of obtaining three-dimensional (3D) representation data corresponding to at least a portion of a second user of a second device during a communication session between the first device and the second device, the 3D representation data generated based on sensor data obtained at the second device. The action further include obtaining offset information corresponding to an offset between a camera viewpoint position and an eye viewpoint position associated with the second device. The action further include based on the 3D representation data and the offset information, adjusting a position of a first portion of a 3D representation of the second user relative to a 3D environment associated with the first device. The action further include providing a view including the first portion and a second portion of the 3D representation of the second user in the 3D environment during the communication session, wherein a position of the second portion of the 3D representation of the second user is free from an adjustment relative to the 3D environment associated with the first device based on the 3D representation data and the offset information.

These and other embodiments can each optionally include one or more of the following features.

In some aspects, the first portion of the 3D representation is associated with a head and an upper portion of a torso of the second user. In some aspects, the second portion of the 3D representation is associated with at least a portion of one or two hands of the second user.

In some aspects, the camera viewpoint position is a viewpoint of a view provided by the second device including a 3D representation of the first user within a physical environment of the second device, and the eye viewpoint position is a viewpoint of an eye of the second user.

In some aspects, adjusting a position of the portion of the 3D representation of the second user includes determining an initial position for the 3D representation based on a relationship between the first user and the second avatar in the communication session, and moving the 3D representation from the initial position based on the offset.

In some aspects, the offset information includes a vertical adjustment value, and the 3D representation is moved from the initial position based on the vertical adjustment value. In some aspects, the offset information includes a head tilt adjustment value, and the 3D representation is moved from the initial position based on the tilt offset adjustment value. In some aspects, the offset information is determined based on sensor data. In some aspects, the offset information corresponds to an offset between a camera viewpoint position and an eye viewpoint position associated with the first device. In some aspects, the offset information is determined based on adjusting an anatomical position of a right eye and a left eye associated with the second user.

In some aspects, the 3D environment includes an extended reality (XR) environment based on passthrough video of a physical environment of the first device.

In some aspects, the first device is located in a first physical environment and the second device is located in a second physical environment different than the first physical environment. In some aspects, the first device or the second device is a head-mounted device (HMD). In some aspects, the HMD includes one or more inward facing image sensors and one or more outward facing image sensors. In some aspects, the sensor data obtained at the second device is captured by the one or more inward facing sensors and the one or more downward facing image sensors.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
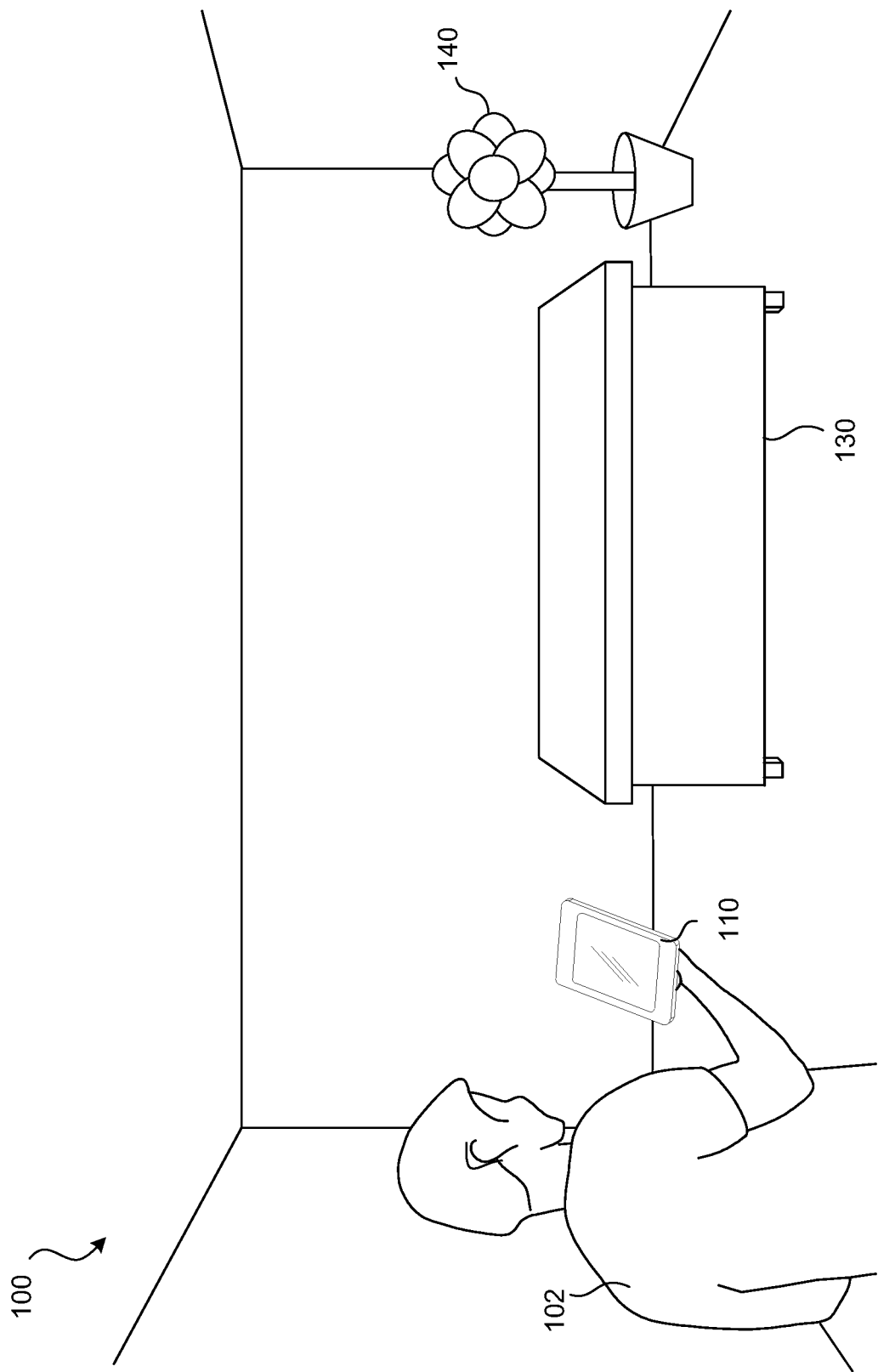
FIG. 1 illustrates a first electronic device and a second electronic device in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary physical environment 100. FIG. 1 illustrates an exemplary electronic device 110 operating in a room of the physical environment 100. In this example, the room includes a desk 130 and potted flowers 140.

The electronic device 110 is illustrated as a single, handheld device. The electronic device 110 may be a mobile phone, a tablet, a laptop, and so forth. In some implementations, electronic device 110 is worn by a user. For example, electronic device 110 may be a watch, a head-mounted device (HMD), a head-worn device that includes transparent lenses (e.g., smart glasses), headphones, an ear-mounted device, and so forth. The device 110 may utilize one or more display elements to present views. For example, the device 110 can display views that include content in the context of an extended reality (XR) environment. In some implementations, the device 110 may enclose the field-of-view of the user 102. In some implementations, the functionalities of device 110 is provided by more than one device. In some implementations, the device 110 communicates with a separate controller or server to manage and coordinate an experience for the user. Such a controller or server may be located in or may be remote relative to the physical environment 100.

The electronic device 110 includes one or more cameras, microphones, depth sensors, motion sensors, or other sensors that can be used to capture information about and evaluate the physical environment 100. The obtained sensor data may be used to generate a 3D representation, such as a 3D point cloud, a 3D mesh, a 3D floor plan, and/or a 3D room plan.

In one example, the one or more sensors can capture information about the head, face, and/or body of the user 102 to generate 3D representation data associated the user 102 that can be used to generate an accurate, live/real-time 3D representation (e.g., avatar) of the user 102. For example, the device 110 may obtain image data, motion data, and/or physiological data (e.g., pupillary data, facial feature data, etc.) from the user 102 via a plurality of sensors. For example, the device 110 obtains eye gaze characteristic data via a first sensor, upper facial feature characteristic data via a second sensor, lower facial feature characteristic data and/or upper torso data via a third sensor, and other body data such as hand movements via a fourth external facing sensor. The user data (e.g., upper facial feature characteristic data, lower facial feature characteristic data, body data, eye gaze characteristic data, etc.) may vary in time and the device 110 may use the user data to generate and/or provide a 3D representation of the user. In some implementations, the user data includes texture data of the facial features such as eyebrow movement, chin movement, nose movement, cheek movement, etc. For example, when a person (e.g., user 102) smiles, the upper and lower facial features can include a plethora of muscle movements that may be replicated by a representation of the user (e.g., an avatar) based on the captured data from the one or more sensors.

Figure 2:
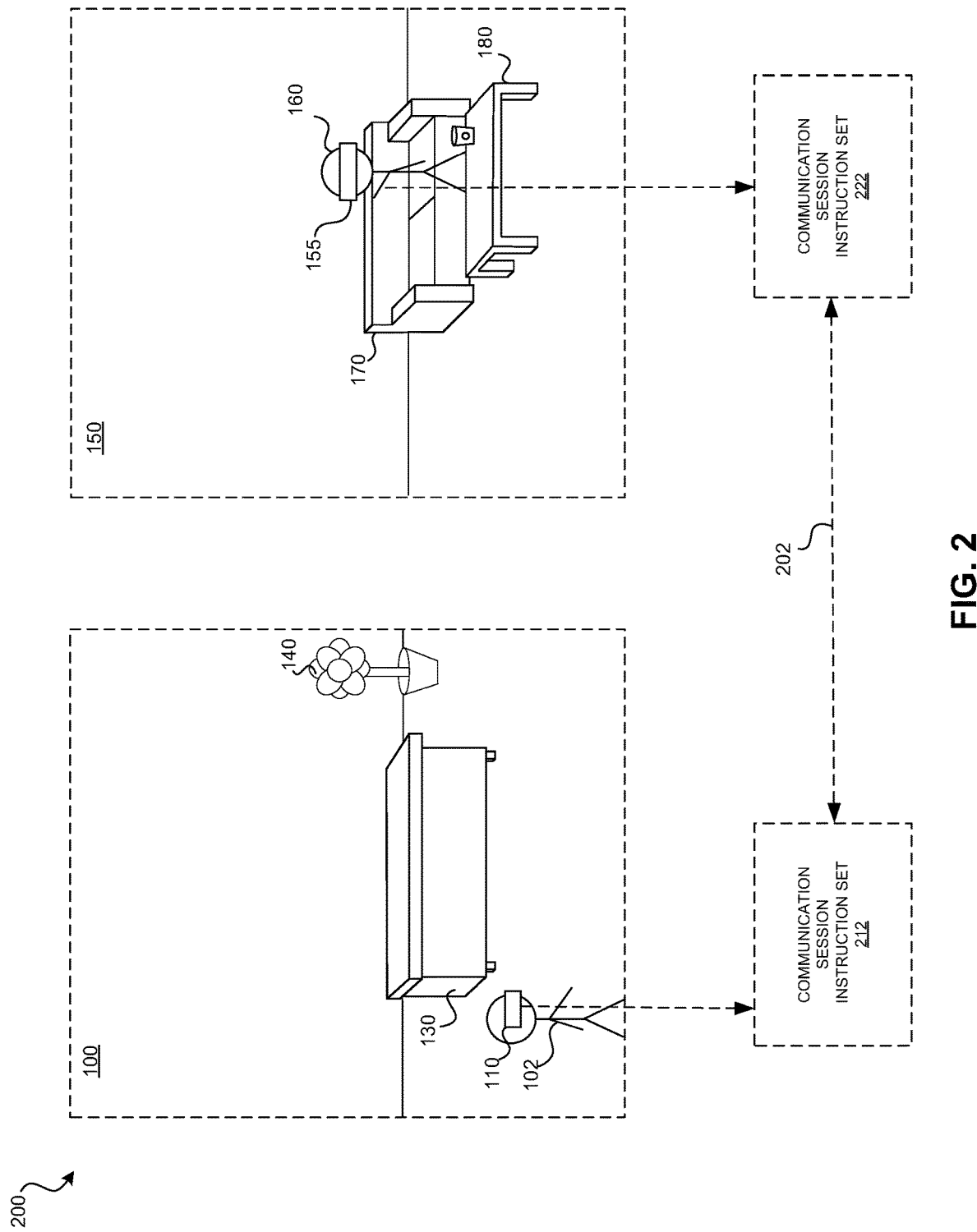
FIG. 2 illustrates exemplary electronic devices operating in different physical environments during a communication session in accordance with some implementations.

FIG. 2 illustrates exemplary operating environment 200 of electronic devices 110, 155 operating in different physical environments 100, 150, respectively, during a communication session, e.g., while the electronic devices 110, 155 are sharing information with one another or an intermediary device such as a communication session server. In this example of FIG. 2, both electronic devices 110, 155 are illustrated as HMDs during a copresence communication session, however, the electronic devices 110, 155 may be other types of devices that are capable of generating and/or transmitting 3D representation data during a communication session.

In this example of FIG. 2, the physical environment 100 from FIG. 1 is a room that includes a desk 130 and potted flowers 140. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content during the communication session. For example, a communication session may provide views to one or more participants (e.g., users 102, 160) of a 3D environment that is generated based on camera images and/or depth camera images of the physical environment 100 as well as a representation of user 102 based on camera images and/or depth camera images of the user 102.

In this example, the physical environment 150 is a room that includes a sofa 170 and a coffee table 180. The electronic device 155 includes one or more cameras, microphones, depth sensors, or other sensors that can be used to capture information about and evaluate the physical environment 150 and the objects within it, as well as information about the user 160 of the electronic device 155. The information about the physical environment 150 and/or user 160 may be used to provide visual and audio content during the communication session. For example, a communication session may provide views of a 3D environment that is generated based on camera images and/or depth camera images (from electronic device 155) of the physical environment 150 as well as a representation of user 160 based on camera images and/or depth camera images (from electronic device 155) of the user 160. For example, a 3D environment may be sent by the device 110 by a communication session instruction set 212 in communication with the device 155 by a communication session instruction set 222 (e.g., via network connection 202). However, it should be noted that representations of the users 102, 160 may be provided in other 3D environments. For example, a communication session may involve representations of either or both users 102, 160 that are positioned within any entirely virtual environment or an extended reality (XR) environment that includes some physical environment representations and some virtual environment representations.

Figure 3:
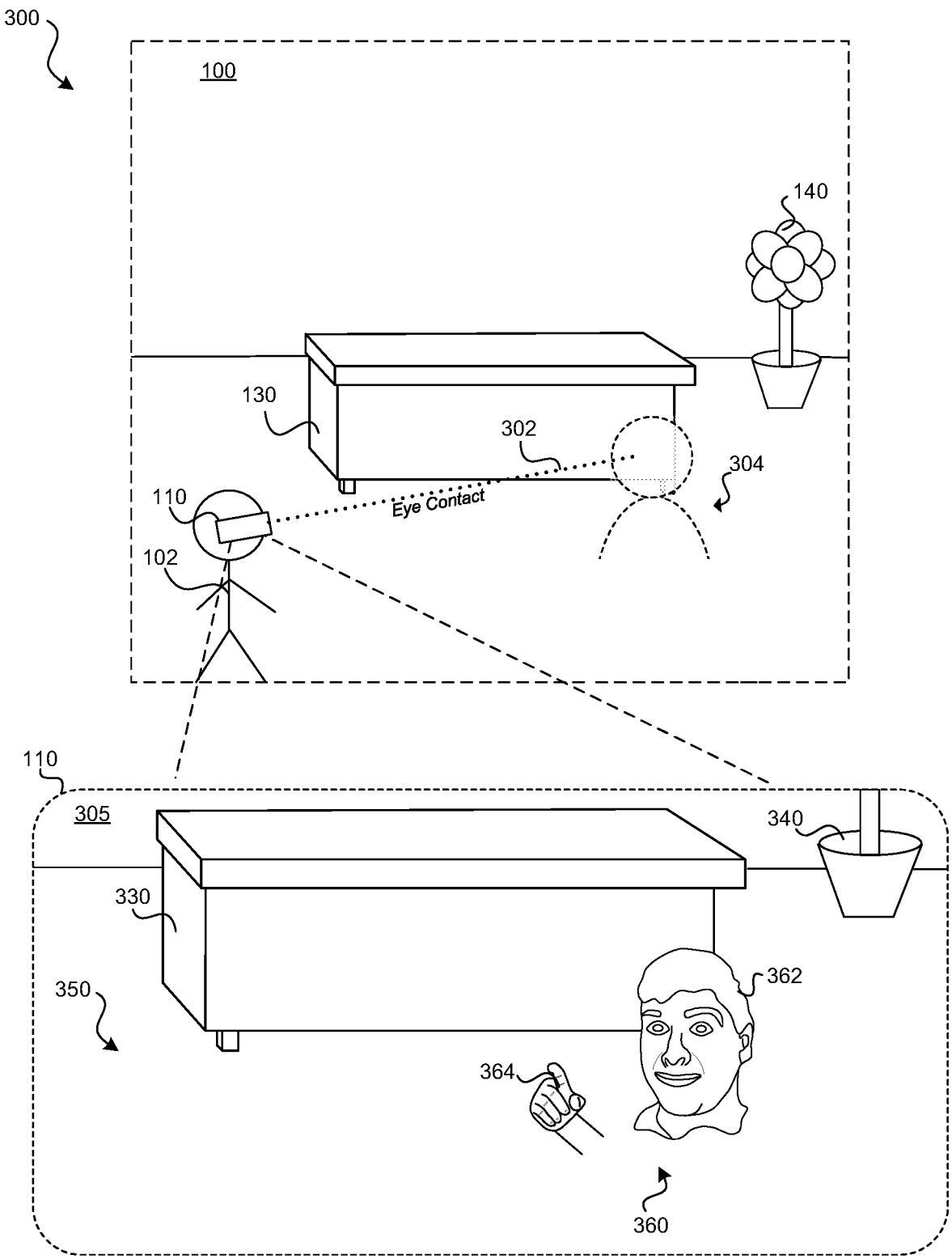
FIG. 3 illustrates an example view provided by the first device of FIG. 1, the view including aspects of a 3D representation associated with another user from a second device in accordance with some implementations.

FIG. 3 illustrates an example view 305 provided by the display elements of the first device 110 of FIG. 2 of the environment 100 during a communication session with another device. The view 305 presents an XR environment 350 that includes aspects of a physical environment (e.g., environment 100 of FIG. 1), and aspects of a 3D representation 360 associated with another user (e.g., user 160) from another device (e.g., device 155) in accordance with some implementations. Additionally, FIG. 3 illustrates eye contact line 302 between the viewpoint of the user 102 via device 110 towards the area 304 where the representation 360 appears to be for the user in the physical environment 100 during a communication session. For example, in a real-world environment (physical environment 100) the representation 360 (e.g., an avatar or any virtual content) is not physically visible to the user 102 if he or she is not using the device 110, but is visible in the view 305, e.g., while viewing a display of the device 110.

The view 305 depicted in FIG. 3 provides a view of the physical environment 100 from a viewpoint facing towards the desk 130 and potted flowers 140. The view 305 includes a representation 330 of the desk 130, a representation 340 of the flowers 140, and a view of the representation 360 (e.g., a 3D avatar) from that viewpoint. However, the viewpoint as shown is for illustrative purposes only, as alternate viewpoints may be shown for the view 305 as the user moves throughout the physical environment 100. Representations 330, 340, 360, 362, 364, may be images (e.g., video) of the actual objects, may be views of each physical object as seen through a transparent or translucent display, may be virtual content that represents each physical object, or representations 330, 340, 360, 362, 364 may be a combination of virtual content and images and/or pass-through video (e.g., an XR experience). Similarly, representation 360 of the user 160 may be an actual video of the user 160, may be generated virtual content that represents the user 160 (e.g., an avatar), or may be a view of the user 160 as seen through a transparent or translucent display.

In some implementations, as illustrated in FIG. 3, the representation 360 (e.g., the generated avatar of user 160) includes a representation 362 associated with a head and a portion of the upper torso and a representation 364 associated with one or both hands of a sender (e.g., user 160 of FIG. 2). In some implementations, the representation 360 may be 3D, as illustrated, and may include more representations associated with additional portions or a full view representation of the user or may only include a representation associated with the face or the sender.

In some implementations, the electronic device 110 within physical environment 100 provides a view 305 that enables user 102 to view a representation 360 that may include representation 362 and/or representation 364 (e.g., an avatar) of at least a portion of the user 102 (e.g., a view of the face/head from mid-torso up, a view of the hands, etc.) within the 3D environment 350. In other words, user representation 360 of user 160 is generated at device 110 (e.g., a receiving device) by generating combined 3D representations of the user 160 for the multiple instants in a period of time based on data obtained from device 155. For example, an avatar may be generated at the receiving device by combining a predetermined 3D representation of user 160 (e.g., a detailed 3D body mesh) with a respective frame-specific 3D representation of user 160 (e.g., a 3D facial representation that is updated each frame and combined with the obtained 3D body mesh). Additionally, or alternatively, in some embodiments, user representation 360 of user 160 is generated at device 155 (e.g., sending device of a speaker)

and sent to device 110 (e.g., viewing device to view an avatar of the speaker). For example, the sending device may combine a body mesh with an updated face representation, and then send the combined avatar to the receiver device. Thus, by having the sending device combine a body mesh with a face representation may save processing demand on the receiving device, which may be particularly useful when there are multiple participants in a communication session.

Referring back to the eye contact line 302 between the viewpoint of the user 102 towards the area 304 where the representation 360 appears to be for the user, an issue regarding mismatched eye contact between user 102 and representation 360 may exist. For example, the eyes of representation 360 may not appear to be looking at the viewpoint of the user 102 while viewing the display of the device 110. For example, an offset between an external facing camera of the device 110 (e.g., a viewpoint of the user 102) and the eyes of the user may cause this offset during pass-through correction techniques. Thus, as further illustrated in FIGS. 4-6 and discussed below, techniques described herein may account for that offset when presenting a view of an avatar of another user (e.g., user representation 360).

Figure 4:
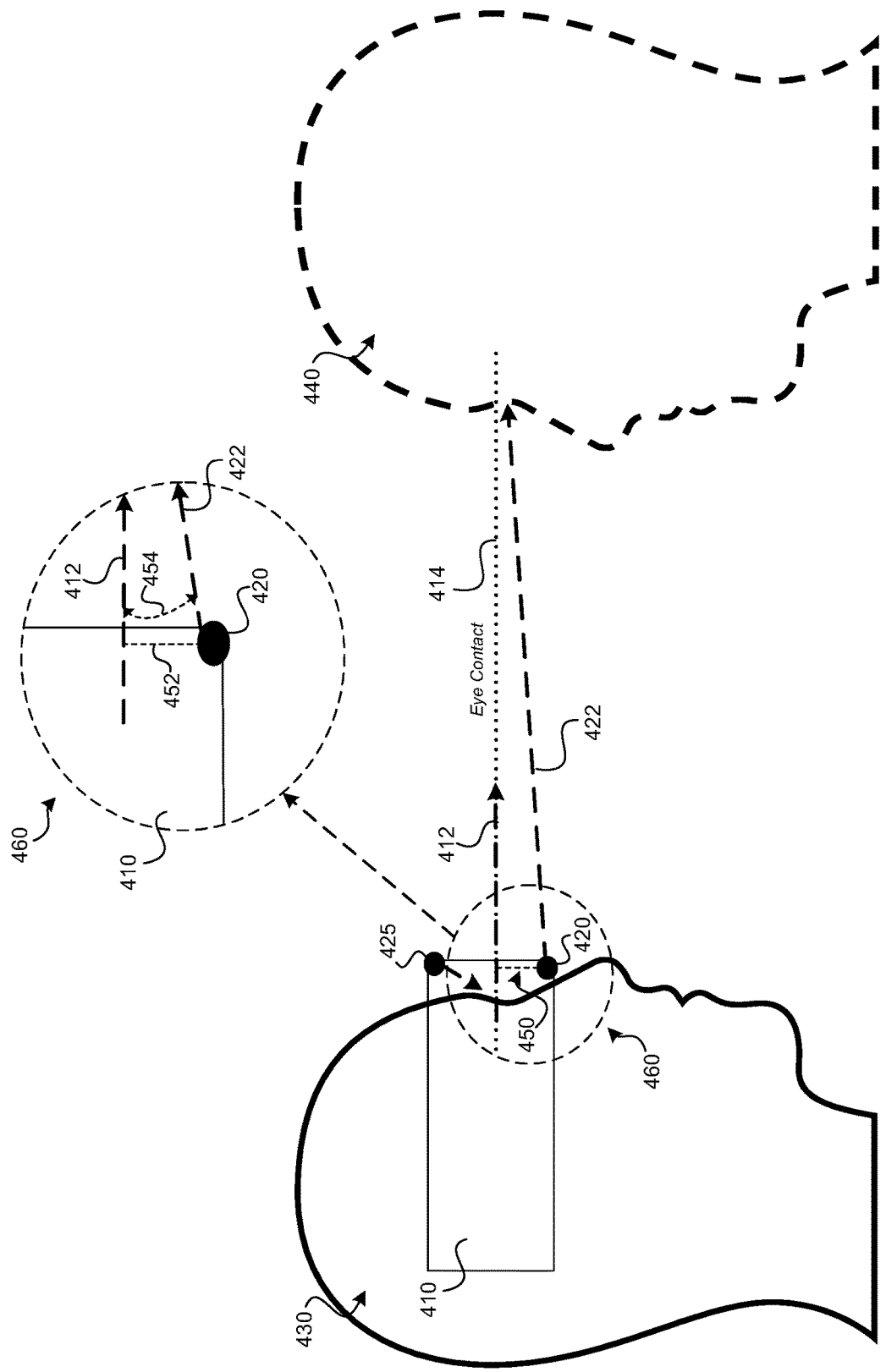
FIG. 4 illustrates an offset between a camera viewpoint position and an eye viewpoint position associated with a head mounted device (HMD) in accordance with some implementations.

FIG. 4 illustrates an offset between a camera viewpoint position and an eye viewpoint position associated with a head mounted device (HMD) in accordance with some implementations. In particular, FIG. 4 illustrates the offset that may occur between two users wearing HMDs during a copresence communication session. For example, a copresence communication session may generally refer to two (or more) users communicating with each other via respective avatars while wearing a head mounted device (HMD). The receiving device may display the 3D representation of the other user based on 3D representation data received from the sending device. The 3D representation data may be based on eye capture data of the user's eyes from the sending device, however, this eye capture data is captured when the user is looking at a passthrough video-based environment in which there is an offset between the camera position of the pass-through video and the sender's actual viewpoint, e.g., a vertical offset between the scene-facing camera and the user's eyes. Thus, the eye capture data may result in the receiving device displaying an avatar having eyes that appear to be looking at something other than what the eyes are actually looking at. In a face-to-face copresence encounter, this offset can result in an eye-contact mismatch in which the displayed avatar eyes appear to be looking above the user's eyes of the receiving device resulting mismatched eye contact between the two users.

For instance, FIG. 4 illustrates a user 430 (e.g., a sender, such as user 160) wearing a device 410 (e.g., an HMD) looking at a representation 440 of another user (e.g., a receiver, such as user 102) during a communication session. As illustrated in FIG. 4, the device 410 is an HMD that includes an inward facing camera (sensor 425) that captures images of the face, and in particular the eyes and eye gaze (e.g., eye viewpoint 412), of the user 430 as the user is looking towards the eyes of the representation 440 of the other user (e.g., represented by eye contact line 414). The device 410 further includes an outward facing camera (sensor 420) that captures a camera point of view (e.g., camera viewpoint 422) that is used by device 410 to display to the user 430 what he or she thinks is the actual point of view. However, because the sensor 420 is not directly in line with the eye gaze 412 of the user 430, there is an offset 450 between the camera point of view from sensor 420 and the eye gaze point of view of the user that sensor 425 is detecting. Thus, when the 3D representation data of the head/face and eye gaze characteristics is sent to a receiving device, the localization of where the user 430 eye viewpoint will be offset by the offset information from offset 450. Although the offset 450, depending on the configuration of the device 410, an HMD, may be a small distance (e.g., <5 cm), the 3D representation (avatar) that is generated without compensation for the offset 450 will appear as if the 3D representation is staring above the user's 430 viewpoint by that small distance (even though the other user believes they are making eye contact from his or her point of view).

In some implementations, as shown in the expanded area 460, the offset 450 may include a straight vertical measurement distance such as about a y-axis (vertical), as illustrated by offset 452. Additionally, or alternatively, the offset 450 may include a straight measurement distance at an angle such as between an x-axis, y-axis, z-axis, or in-between any of the axis. Additionally, or alternatively, the offset 450 may include an arcuate measurement distance (e.g., to a degree of the curve) such as about a curved line, as illustrated by offset 454.

FIGS. 5A-5D illustrate exemplary views of an electronic device viewing a three-dimensional (3D) representation of another user during a communication session in an XR environment, in accordance with some implementations. For instance, as opposed to an illustration showing the offset (e.g., offset 450) that is accounted for from the sender (e.g., user 430) at a sending device 410, FIGS. 5A-5D are illustrations showing the offset from the perspective of a receiving device. For example, FIGS. 5A-5D illustrate example views 505A-D, respectively, provided by the display elements of the device 510 worn by a receiver (user 530) during a communication session with another device (e.g., a device a sender is using that the 3D representation 540 is generated and is based on). The views 505 present an XR environment 550 that may include aspects of a physical environment (e.g., environment 100 of FIG. 1), and aspects of a 3D representation 540 associated with another user (e.g., user 160) from another device (e.g., device 155 from FIG. 2) in accordance with some implementations. Each view 505 represents the view from the camera viewpoint position 522 from the sensor 520. Additionally, FIGS. 5A-5D illustrate an eye contact line 545 of the 3D representation 540 (e.g., the apparent viewpoint of the sender's avatar to the receiver) between the viewpoint of the 3D representation 540 of the sender towards the device 510 but appears to be a 3D representation of the receiver at the sender's device during a communication session (e.g., each user is viewing an avatar of the other person). For example, in a real-world environment (physical environment 100) the representation 540 (e.g., an avatar or any virtual content) is not physically visible to the user 530 if he or she is not using the device 510, but is visible in each view 505A-D, e.g., while viewing a display of the device 510.

Figure 5A:
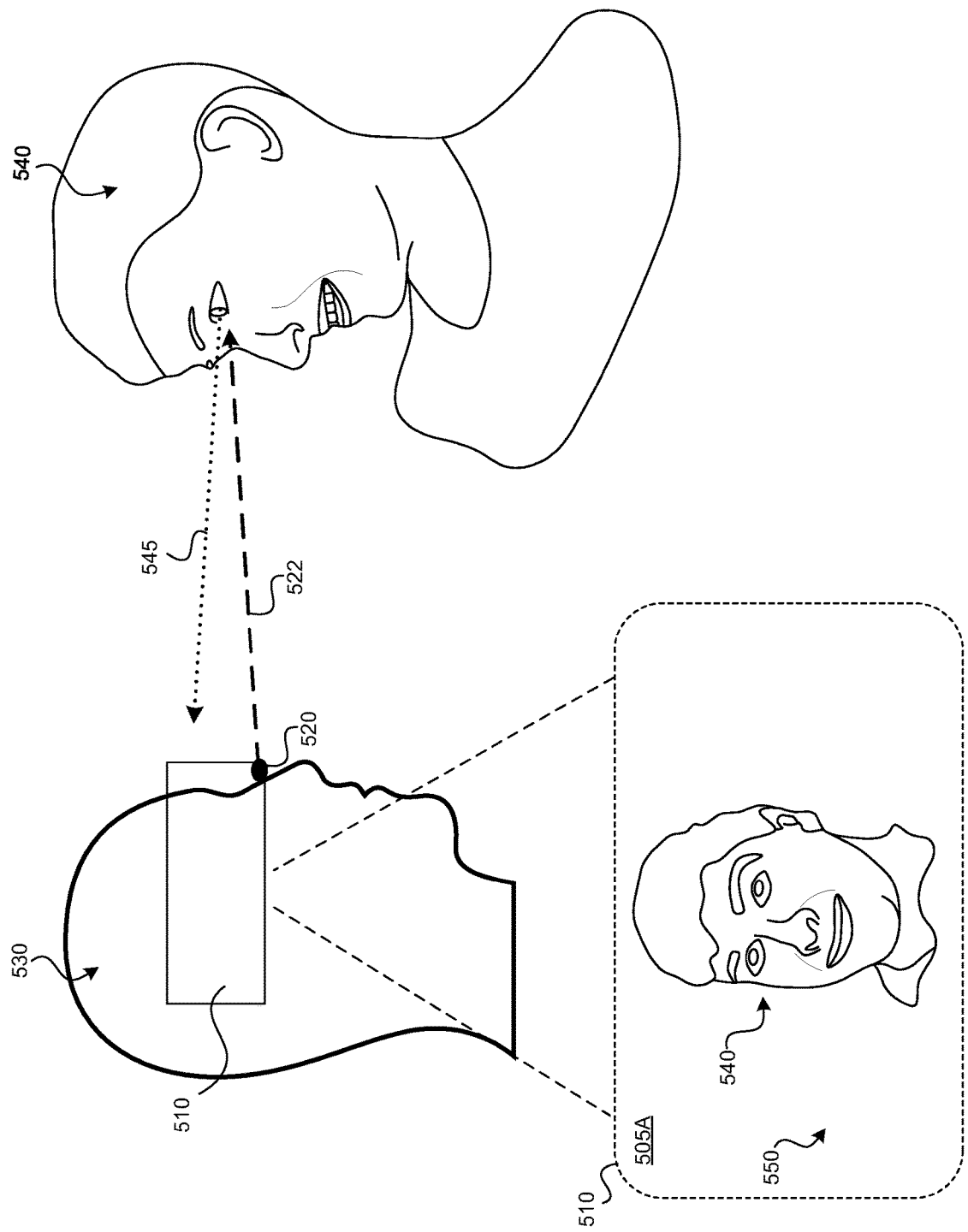
FIGS. 5A-5D illustrate exemplary views of an electronic device viewing a three-dimensional (3D) representation of another user during a communication session in an XR environment, in accordance with some implementations.

FIGS. 5A-5D illustrate the impact of various adjustments of a position of the 3D representation 540 to compensate for the mismatch in eye contact caused by the offset. To establish a baseline from which the impact from certain adjustments can be gauged, FIG. 5A illustrates a view 505A without an adjustment. As a result, eye contact line 545 and the view of the 3D representation 540 appear to be looking above the user's 530 eyes.

Figure 5B:
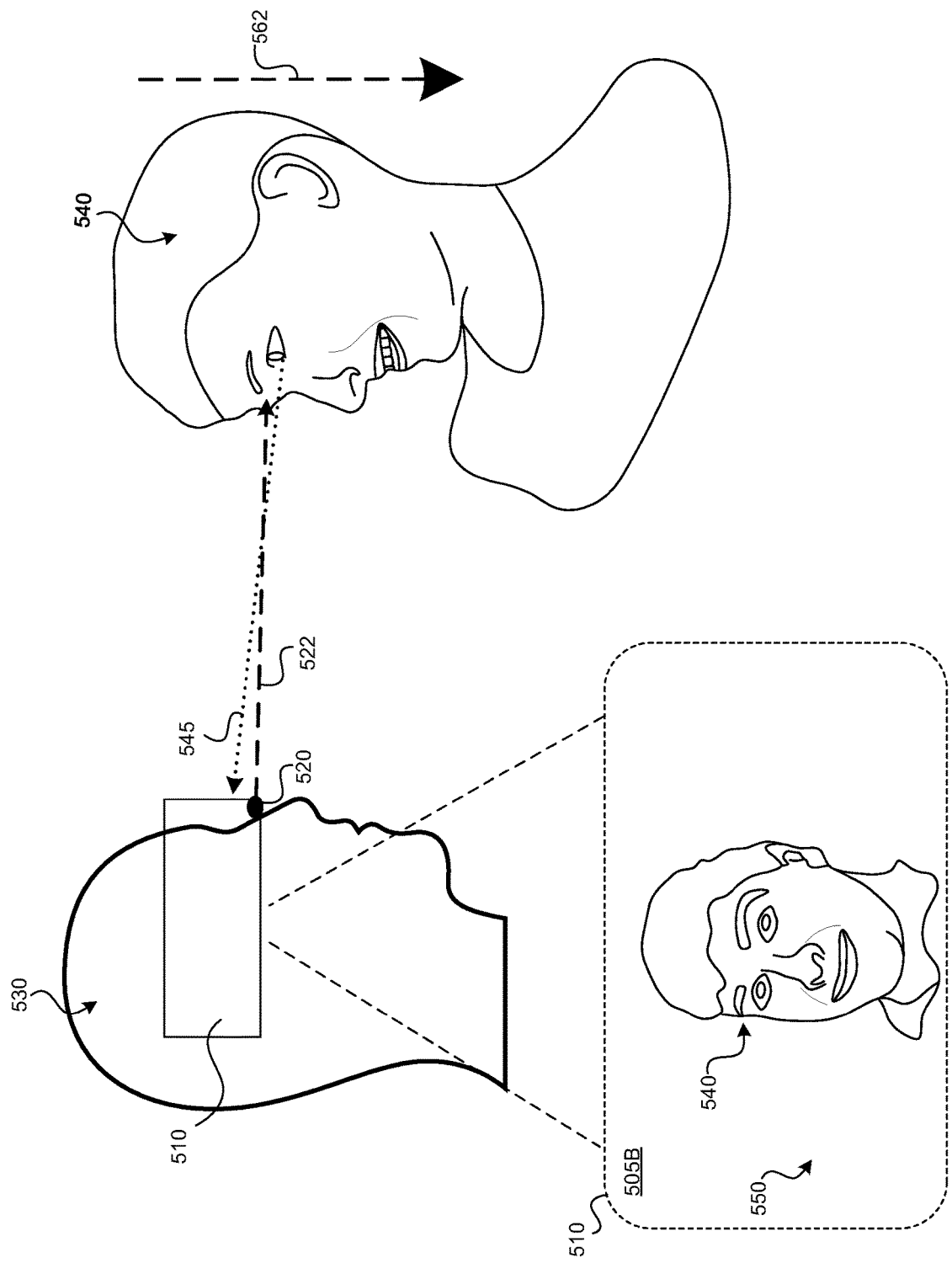

FIG. 5B illustrates a view 505B with a translational adjustment of avatar 540 (e.g., the avatar of the user operating the sending device) about one or more axes. For instance, the avatar can be translated to a different position based on an offset distance and direction, such as 3 cm vertically downward, or any other direction in the 3D coordinate space depending on the offset between the camera and the eyes of the user operating the sending device. As a result of this adjustment, the eye contact line 545 and the view 505B of the 3D representation 540 appear to be looking closer to the user's 530 eyes compared to the unadjusted view 505A.

Figure 5C:
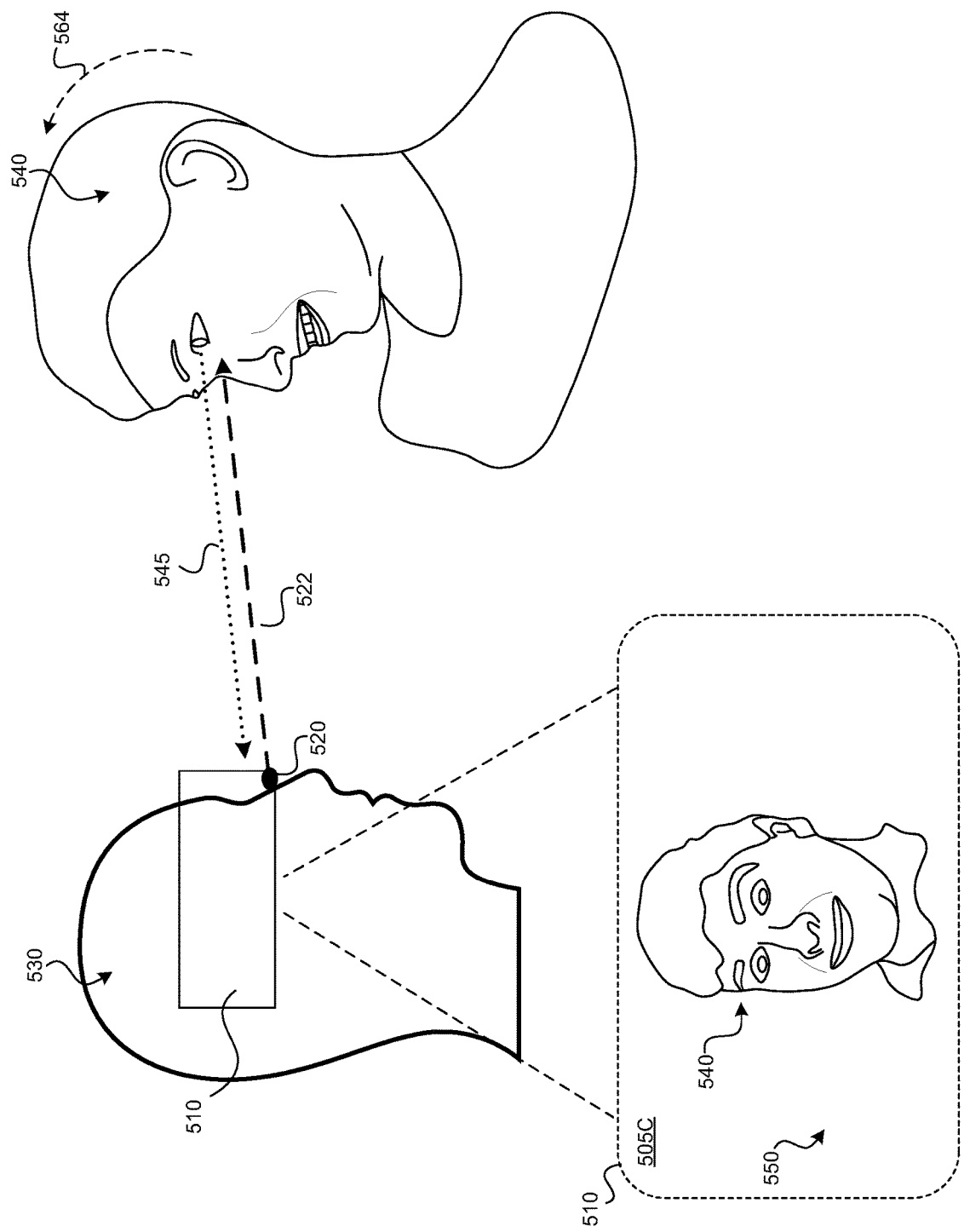

FIG. 5C illustrates a view 505C with a tilt adjustment of avatar 540, according to some embodiments of the present disclosure. An exemplary tilt adjustment includes an adjustment of a head/torso tilt (e.g., tilting the avatar down based on an offset distance, such as the arcuate offset 454). As a result of this adjustment, the eye contact line 545 and the view 505C of the 3D representation 540 appear to be looking closer to the user's 530 eyes compared to the unadjusted view 505A.

Figure 5D:
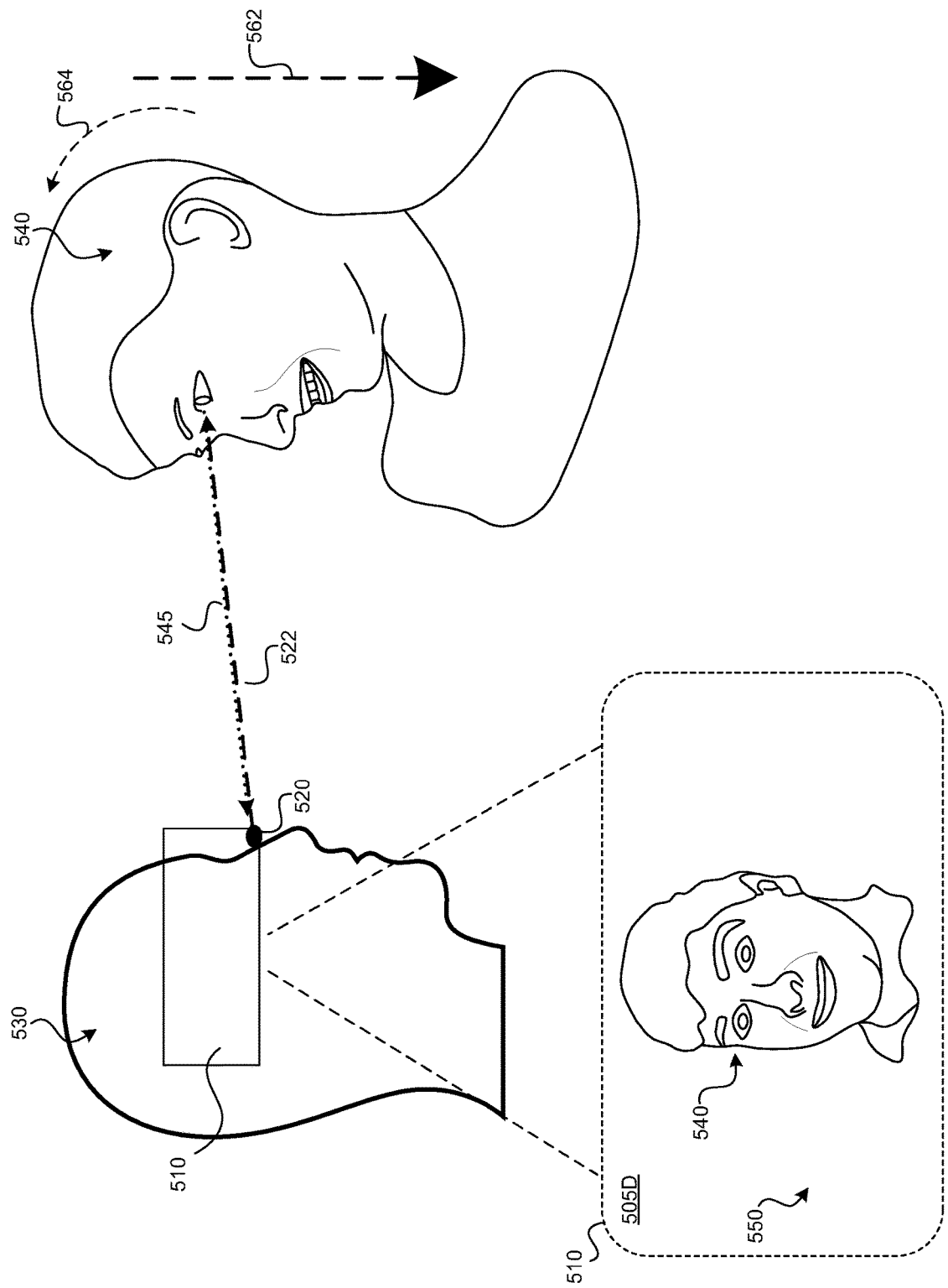

Although FIGS. 5B and 5C illustrate examples where only one of a translational adjustment or tilt adjustment is performed on avatar 540, embodiments are not so limited and more than one different type of adjustment scan be performed to encourage eye contact. For instance, FIG. 5D illustrates a view 505D with an adjustment of both about a vertical axis and a head/torso tilt; thus, the eye contact line 545 and the view 505B of the 3D representation 540 appear to be looking at the user's 530 eyes compared to the unadjusted view 505A of FIG. 5A.

In some techniques described herein, the offset between a viewer's viewpoint position and a camera's viewpoint position may be accounted for by adjusting a position of and/or orienting the 3D representation so that the eyes will appear to be looking at what the eyes are actually looking at (e.g., for direct eye contact during the communication session), as illustrated in FIGS. 5A-5D. For example, the receiver may display the 3D representation at a lower position and/or tilt the 3D representation slightly upward so that the 3D representation appears to the receiver to be looking in the receiver's eyes, as intended. However, as further discussed herein with reference to FIGS. 6A, 6B, a receiving device may adjust only a portion of the 3D representation (e.g., head/torso portion), but would not adjust hand positions based on that offset so that the hands portion are perceived correctly. Additionally, a visual treatment may be used to hide any visual gaps.

Figure 6A:
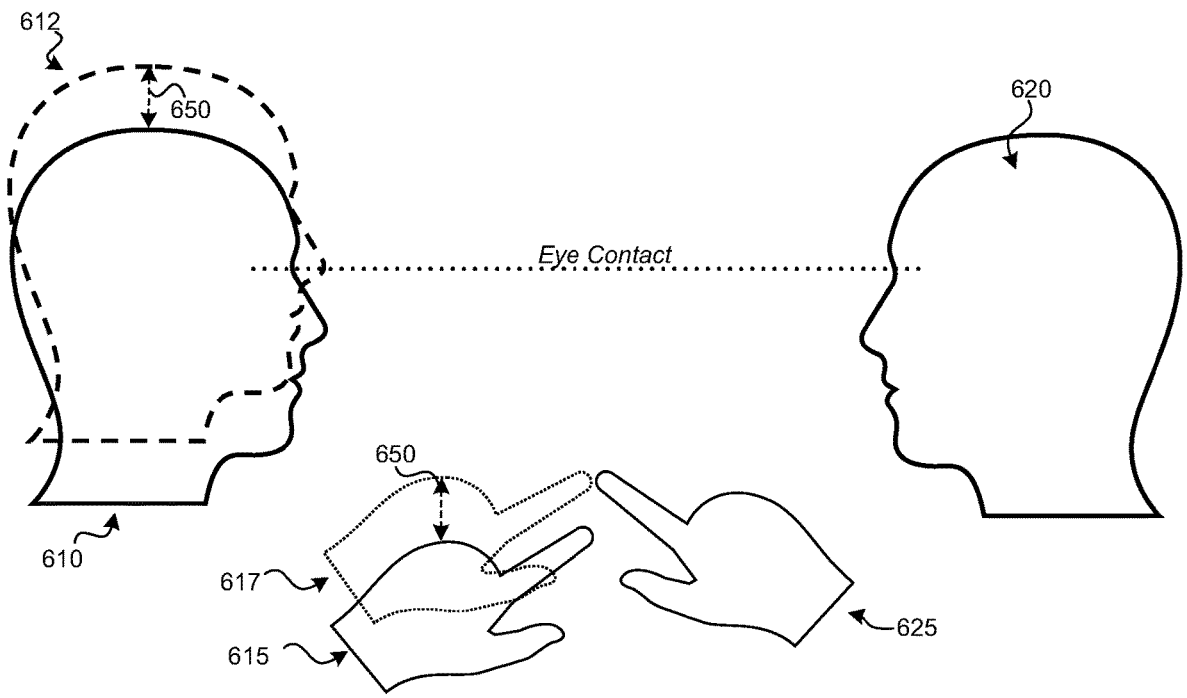
FIG. 6A illustrates adjusting a position of a first portion of a 3D representation associated with the head and upper torso of a user and adjusting a position of a second portion of a 3D representation associated with a hand of a user in accordance with some implementations.

FIG. 6A illustrates adjusting a position of a first portion of a 3D representation associated with the head and upper torso of a user and adjusting a position of a second portion of a 3D representation associated with a hand of a user in accordance with some implementations. For instance, FIG. 6A illustrates adjusting (e.g., moving down a y-axis) a first portion of a 3D representation from a first position (e.g., head/torso 3D representation 612) to a second position (e.g., head/torso 3D representation 610) based on the determined or obtained offset 650 information so that the viewpoint of the user associated with the 3D representation 620 is along the eye contact position. Additionally, FIG. 6A illustrates adjusting (e.g., moving down a y-axis) a second portion of a 3D representation from a first position (e.g., hands 3D representation 617) to a second position (e.g., hands 3D representation 610) based on the determined or obtained offset 650 information. However, based on that adjustment of the hands, the hands 3D representation 625 associated with the user for 3D representation 620 are not correctly perceived and appears to be "off" because of the offset adjustment.

Figure 6B:
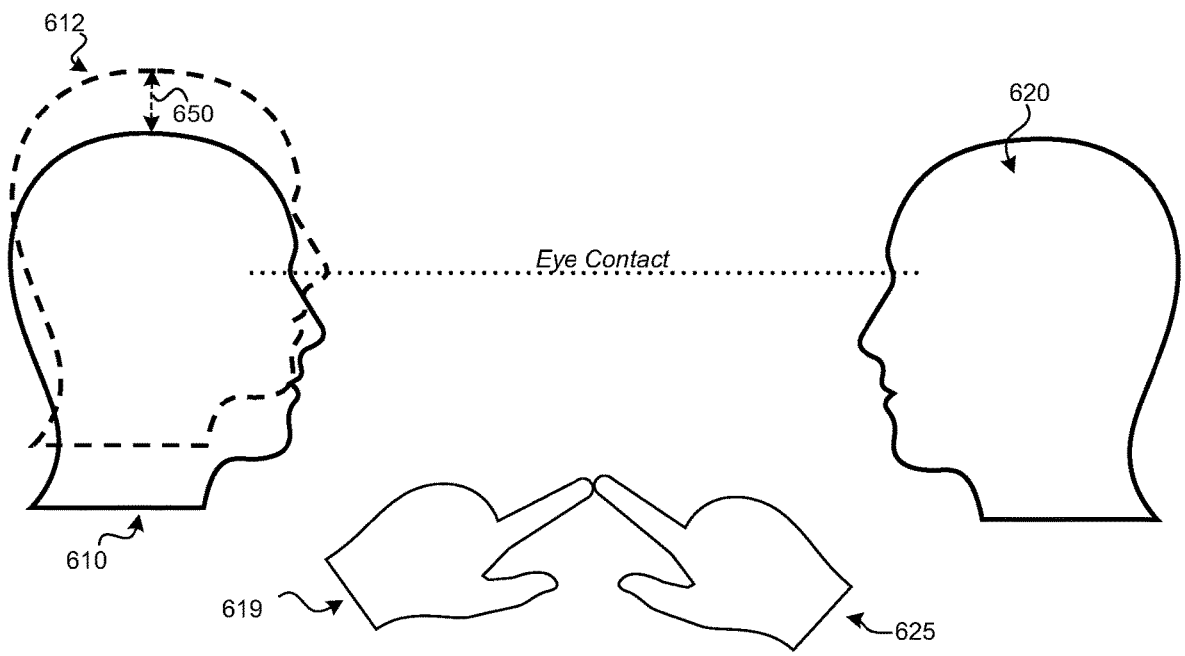
FIG. 6B illustrates adjusting a position of a first portion of a 3D representation associated with the head and upper torso of a user and not adjusting a position of a second portion of a 3D representation associated with a hand of a user in accordance with some implementations.

FIG. 6B illustrates adjusting a position of a first portion of a 3D representation associated with the head and upper torso of a user and not adjusting a position of a second portion of a 3D representation associated with a hand of a user in accordance with some implementations. For instance, similar to FIG. 6A, FIG. 6B also illustrates adjusting the first portion of a 3D representation (e.g., adjusting the head/torso 3D representation 610) based on the offset 650 information. However, as opposed to the mismatched hands as illustrated in FIG. 6A, FIG. 6B illustrates the hands 3D representation 619 is free from an adjustment and is thus perceived as aligned with the hands 3D representation 625 associated with the user for 3D representation 620 (e.g., the users trying to virtually touch each other's hands, such as a virtual first bump).

Figure 7:
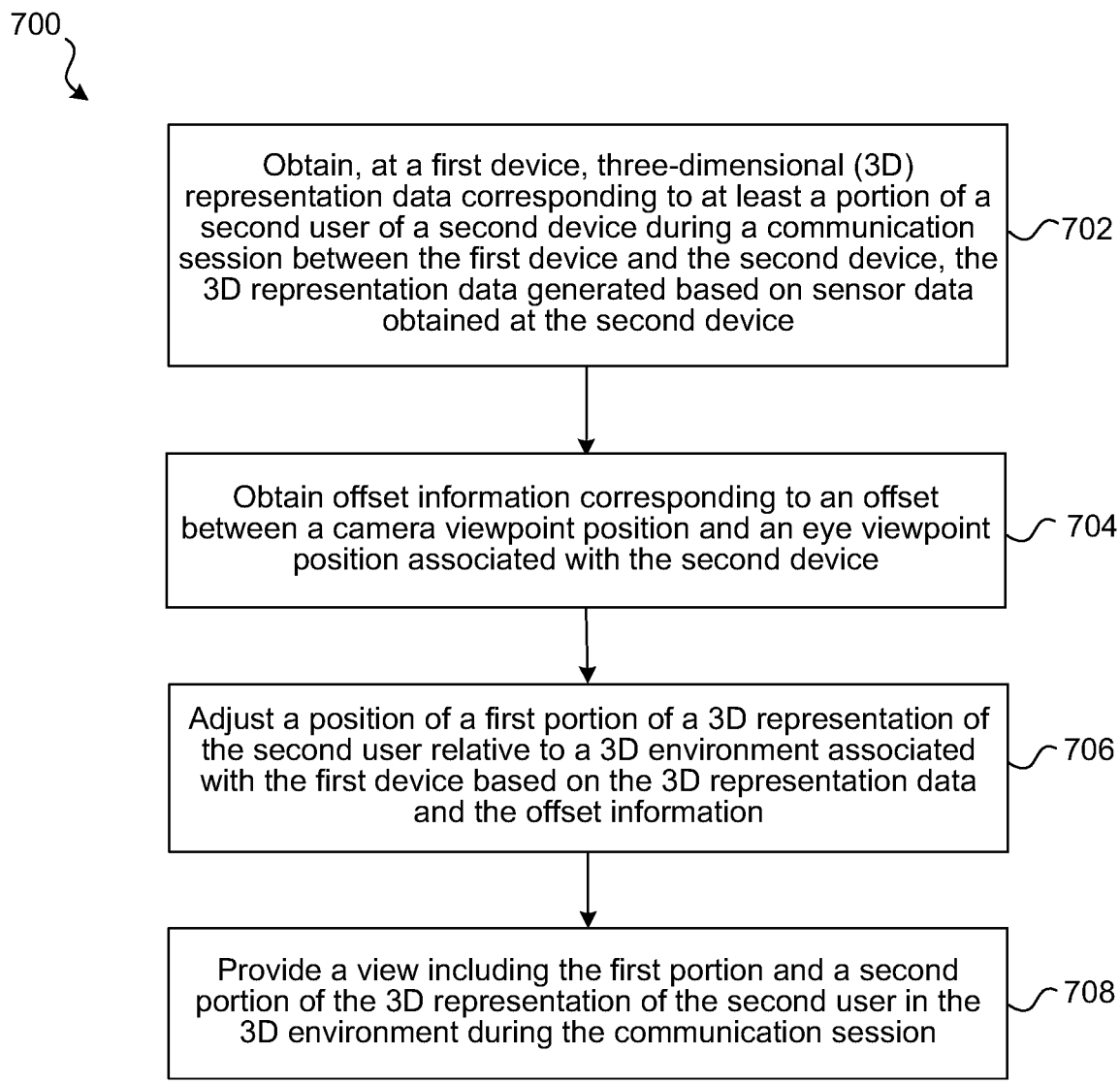
FIG. 7 is a flowchart illustrating a method for providing a view of an adjusted position of a 3D representation of another user during a communication session in accordance with some implementations.

FIG. 7 is a flowchart illustrating a method 700 for providing a view of an adjusted position of a 3D representation of another user (e.g., an avatar) during a communication session in accordance with some implementations. In some implementations, a device such as electronic device 110 or device 155 performs method 700. In some implementations, method 700 is performed on a mobile device, desktop, laptop, HMD, or server device. The method 700 is performed by processing logic, including hardware, firmware, software, or a combination thereof. In some implementations, the method 700 is performed on a processor executing code stored in a non-transitory computer-readable medium (e.g., a memory).

At block 702 the method 700 obtains, at a first device (e.g., receiver device, such as device 110 or device 510) 3D representation data corresponding to at least a portion of a second user of a second device (e.g., sender device, such as device 155 or device 410) during a communication session between the first device and the second device, the 3D representation data generated based on sensor data (e.g., depth data) obtained at the second device (e.g., by a sensor of the second device, e.g., camera, IMU, etc.) For example, the 3D representation data may be based on sensor data capturing images of the second user's eyes, head, hands, torso, etc. For example, the first device may be device 510 of FIG. 5 (e.g., an HMD of a receiver) and the second device may be device 410 (e.g., an HMD of a sender), and a sensor, such as a camera, IMU, or the like, may be used by the second device to obtain sensor data to generate the 3D representation.

At block 704, the method 700 obtains offset information (e.g., a vertical offset value) corresponding to an offset between a camera viewpoint position and an eye viewpoint position associated with the second device. In some implementations, the camera viewpoint position is a viewpoint of a view provided by the second device including a 3D representation of the first user within a physical environment of the second device (e.g., pass-through video augmented with an avatar of the user of the first/receiving device). In some implementations, the eye viewpoint position is a viewpoint of an eye of the second user that may be actual/measured or estimated based on a typical user.

At block 706, the method 700 adjusts a position of a first portion of a 3D representation of the second user relative to a 3D environment associated with the first device based on the 3D representation data and the offset information. In an exemplary implementation. In some implementations, the first portion of the 3D representation is associated with a head and an upper portion of a torso of the second user. In some implementations, adjusting a position of the 3D representation may involve determining an initial position of the 3D representation based on an expected positional relationship between the first user and the 3D representation in the co-presence session. Additionally, or alternatively, adjusting a position of the 3D representation may involve moving the 3D representation (e.g., down, tilt, etc.) to account for the offset. Additionally, or alternatively, adjusting a position of the 3D representation may involve a vertical adjustment, a horizontal adjustment, another directional adjustment, and/or tilt adjustments. In some implementations, some portions of the 3D representation (e.g., head, torso, etc., i.e., representation 362) may be positioned to account for the offset while other portions (e.g., hands, etc., i.e., representation 364) may be positioned without regard to the offset.

In some implementations, adjusting a position of the portion of the 3D representation of the second user includes determining an initial position for the 3D representation based on a relationship between the first user and the second avatar in the communication session, and moving the 3D representation from the initial position based on the offset. In some implementations, as illustrated in FIG. 5B, the offset information includes a vertical adjustment value (e.g., y-axis offset adjustments), and the 3D representation is moved from the initial position based on the vertical adjustment value. In some implementations, as illustrated in FIG. 5C, the offset information includes a head tilt adjustment value (e.g., tilt offset adjustments based on an arcuate angle), and the 3D representation is moved from the initial position based on the tilt offset adjustment value.

In some implementations, the offset information is determined based on sensor data (e.g., head to HMD offset estimated from inward facing camera images). In some implementations, the offset information corresponds to an offset between a camera viewpoint position and an eye viewpoint position associated with the first device. In some implementations, the offset information is determined based on adjusting an anatomical position of a right eye and a left eye associated with the second user. For example, the offset that is used to reposition the avatar may be subject specific, i.e., based on the sender's actual eye position relative to the camera position.

At block 708, the method 700 provides a view including the first portion and a second portion of the 3D representation of the second user in the 3D environment during the communication session. In an exemplary implementation, the position of the first portion is adjusted (e.g., from block 706), however, a position of the second portion of the 3D representation of the second user is free from an adjustment (not adjusted) relative to the 3D environment associated with the first device based on the 3D representation data and the offset information. In some implementations, the first portion of the 3D representation is associated with a head and an upper portion of a torso of the second user, and the second portion of the 3D representation is associated with at least a portion of one or two hands of the second user. For example, method 700 provides a view of an avatar where the position of the head/torso is adjusted, but the position of hands stay uncorrected, as illustrated in FIG. 6B.

In some implementations, providing a view may involve corrections for spatial hand truth based on the offset errors so hands are correctly perceived in actual position. In an exemplary implementation, the view further includes a second portion (e.g., hands) of the 3D representation of the second user, and a position of the second portion of the 3D representation of the second user is free from an adjustment (e.g., not adjusted) relative to the 3D environment associated with the first device based on the 3D representation data and the offset information (e.g., only adjusting the head and torso, hands stay uncorrected). For example, the receiver may adjust only a portion of the avatar, e.g., not adjusting hand positions so that the avatar's hands are correctly perceived, which provides a visual perspective to hide any visual gaps based on repositioning some portions of the avatar but not others. For example, as illustrated in 6B, the representation 610b of the head/torso portion of the avatar is adjusted by the offset 650, but the representation 615b of the hand is not adjusted by the offset 650.

In some implementations, the 3D environment includes an extended reality (XR) environment based on passthrough video of a physical environment of the first device. In some implementations, as illustrated in FIG. 2, the first device (e.g., device 110) is located in a first physical environment (e.g., environment 100) and the second device (e.g., device 155) is located in a second physical environment (e.g., environment 150) different than the first physical environment.

Figure 8:
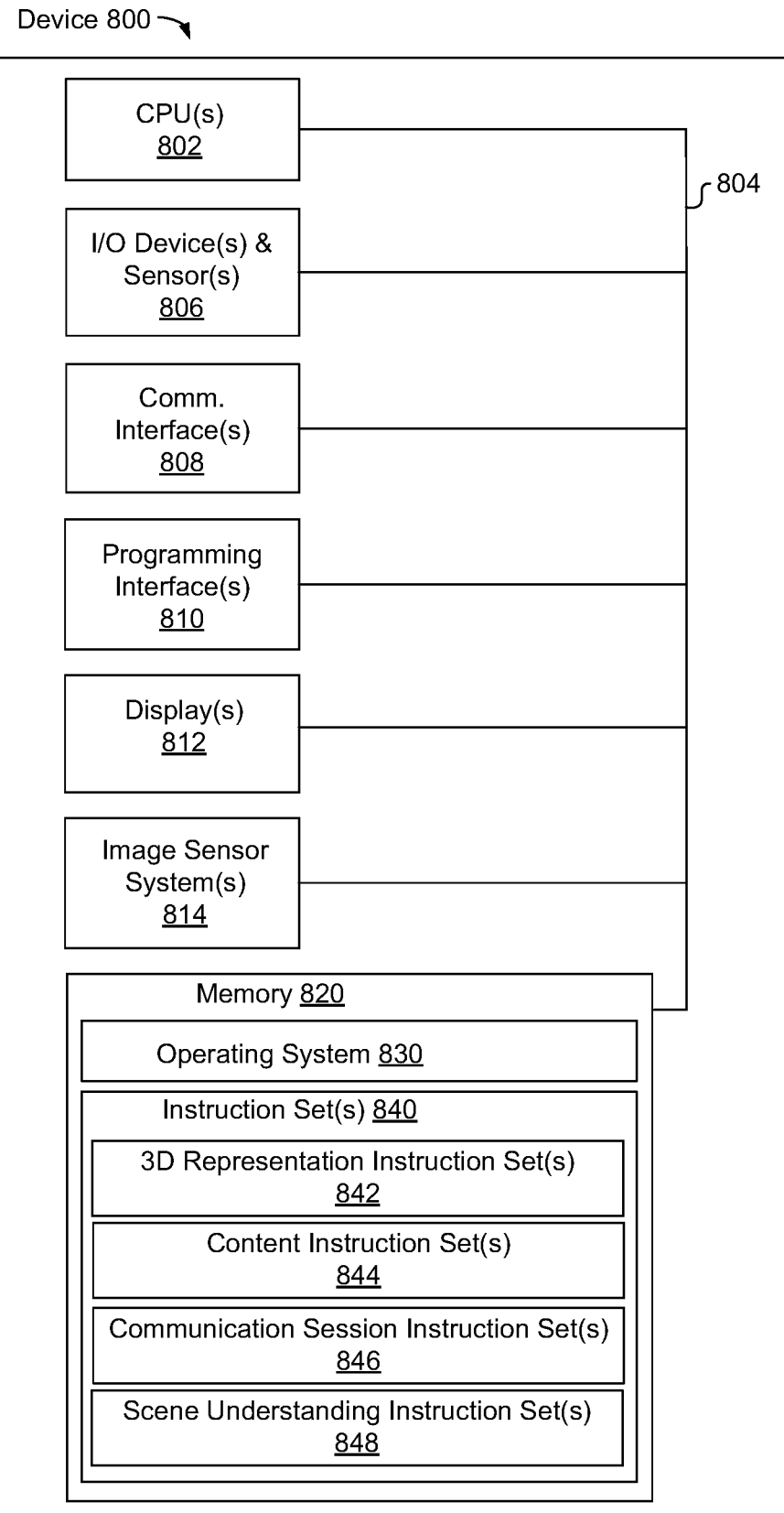
FIG. 8 illustrates device components of an exemplary device according to some implementations.

FIG. 8 is a block diagram of an example device 800. Device 800 illustrates an exemplary device configuration for an electronic device (e.g., devices 110, 155, 410, 510, etc.). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 110 or device 120 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 110 or device 120 includes a single display. In another example, the device 110 or device 120 includes a display for each eye of the user (e.g., an HMD).

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a 3D representation instruction set 842, content instruction set 844, communication session instruction set 846, and a scene understanding instruction set 848. The instruction set(s) 840 may be embodied a single software executable or multiple software executables.

In some implementations, the 3D representation instruction set 842 is executable by the processing unit(s) 802 to generate 3D representation data (e.g., depth map, 3D point cloud, semantically labeled, etc.). For example, the 3D representation instruction set 842 obtains sensor data of a physical environment (e.g., physical environment 100 of FIG. 1) and generates 3D representation data (e.g., a 3D mesh representation, a 3D point cloud with associated semantic labels, or the like) using techniques described herein.

In some implementations, the content instruction set 844 is executable by the processing unit(s) 802 to provide and/or track content for display on a device. The content instruction set 844 may be configured to monitor and track the content over time (e.g., while viewing an XR environment), and generate and display virtual content. To these ends, in various implementations, the instruction includes instructions and/or logic therefor, and heuristics and metadata therefor.

In some implementations, the communication session instruction set 846 is executable by the processing unit(s) 802 to execute a communication session between two or more devices using one or more techniques. For example, a communication session may involve representations of either or both users that are positioned within any entirely virtual environment or an XR environment that includes some physical environment representations and some virtual environment representations. To these ends, in various implementations, the instruction includes instructions and/or logic therefor, and heuristics and metadata therefor.

In some implementations, the scene understanding instruction set 848 is executable by the processing unit(s) 802 to determine a context of the experience and/or the environment (e.g., create a scene understanding to determine the objects or people in the content or in the environment, where the user is, what the user is watching, etc.) using one or more of the techniques discussed herein (e.g., object detection, facial recognition, etc.) or as otherwise may be appropriate. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 9:
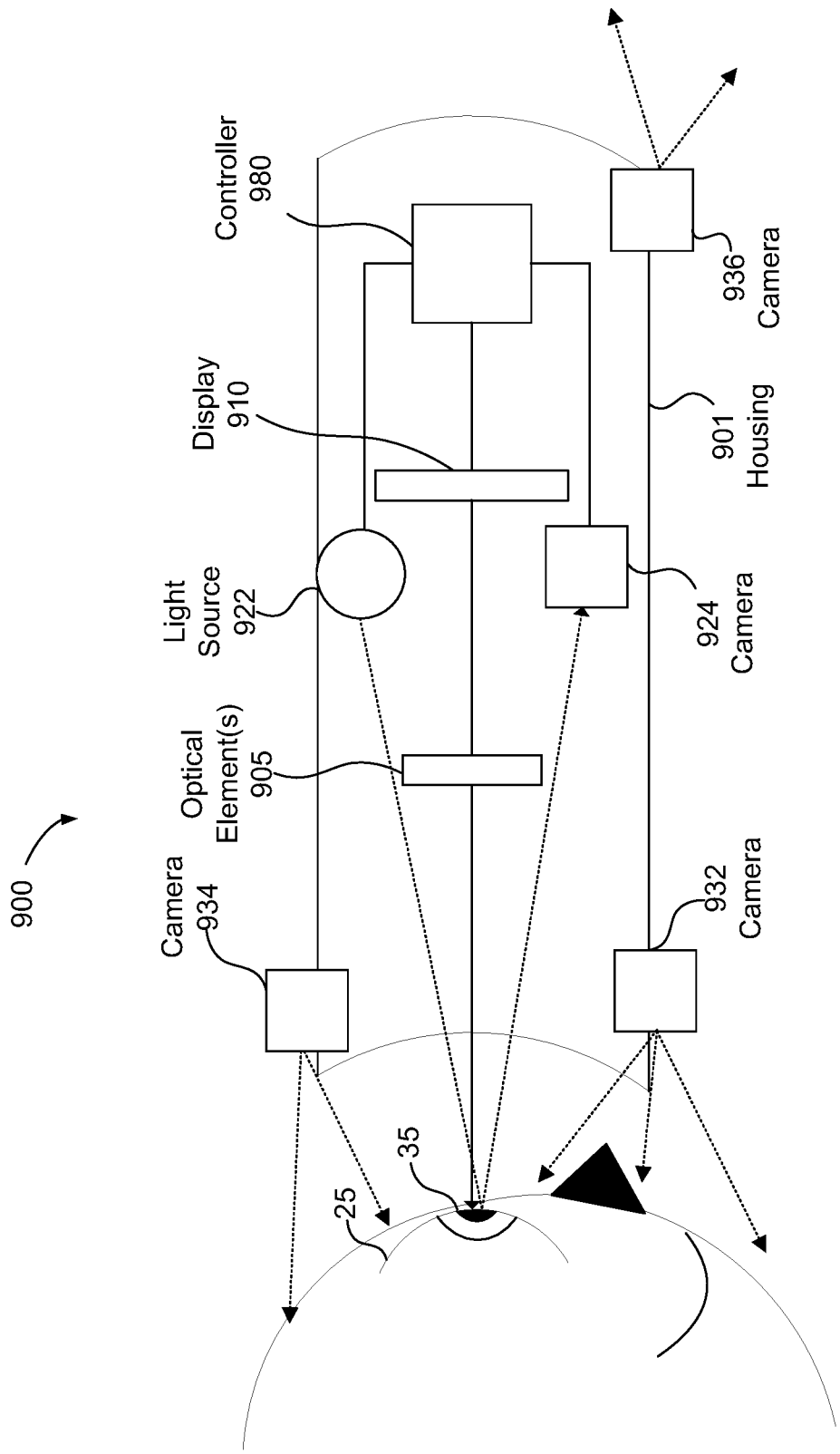
FIG. 9 illustrates an example of an HMD in accordance with some implementations.

FIG. 9 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user 25) end of the housing 901. In various implementations, the eye pad is a plastic or rubber piece that comfortably and snugly keeps the head-mounted device 900 in the proper position on the face of the user 25 (e.g., surrounding the eye of the user 25).

The housing 901 houses a display 910 that displays an image, emitting light towards or onto the eye of a user 25. In various implementations, the display 910 emits the light through an eyepiece having one or more optical elements 905 that refracts the light emitted by the display 910, making the display appear to the user 25 to be at a virtual distance farther than the actual distance from the eye to the display 910. For example, optical element(s) 905 may include one or more lenses, a waveguide, other diffraction optical elements (DOE), and the like. For the user 25 to be able to focus on the display 910, in various implementations, the virtual distance is at least greater than a minimum focal distance of the eye (e.g., 7 cm). Further, in order to provide a better user experience, in various implementations, the virtual distance is greater than 1 meter.

The housing 901 also houses a tracking system including one or more light sources 922, camera 924, camera 932, camera 934, camera 936, and a controller 980. The one or more light sources 922 emit light onto the eye of the user 25 that reflects as a light pattern (e.g., a circle of glints) that can be detected by the camera 924. Based on the light pattern, the controller 980 can determine an eye tracking characteristic of the user 25. For example, the controller 980 can determine a gaze direction and/or a blinking state (eyes open or eyes closed) of the user 25. As another example, the controller 980 can determine a pupil center, a pupil size, or a point of regard. Thus, in various implementations, the light is emitted by the one or more light sources 922, reflects off the eye of the user 25, and is detected by the camera 924. In various implementations, the light from the eye of the user 25 is reflected off a hot mirror or passed through an eyepiece before reaching the camera 924.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 910 by looking at it), provide foveated rendering (e.g., present a higher resolution in an area of the display 910 the user 25 is looking at and a lower resolution elsewhere on the display 910), or correct distortions (e.g., for images to be provided on the display 910).

In various implementations, the one or more light sources 922 emit light towards the eye of the user 25 which reflects in the form of a plurality of glints.

In various implementations, the camera 924 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 932, camera 934, and camera 936 are frame/shutter-based cameras that, at a particular point in time or multiple points in time at a frame rate, can generate an image of the face of the user 25 or capture an external physical environment. For example, camera 932 captures images of the user's face below the eyes, camera 934 captures images of the user's face above the eyes, and camera 936 captures the external environment of the user (e.g., environment 100 of FIG. 1). The images captured by camera 932, camera 834, and camera 836 may include light intensity images (e.g., RGB) and/or depth image data (e.g., Time-of-Flight, infrared, etc.).

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a first device associated with a first user, the first device having a processor:
   obtaining three-dimensional (3D) representation data corresponding to at least a portion of a second user of a second device during a communication session between the first device and the second device, the 3D representation data generated based on sensor data obtained at the second device;
   obtaining offset information corresponding to an offset between a camera viewpoint position and an eye viewpoint position associated with the second device;
   based on the 3D representation data and the offset information, adjusting a position of a first portion of a 3D representation of the second user relative to a 3D environment associated with the first device; and
   providing a view comprising the first portion and a second portion of the 3D representation of the second user in the 3D environment during the communication session, wherein a position of the second portion of the 3D representation of the second user is free from an adjustment relative to the 3D environment associated with the first device based on the 3D representation data and the offset information.

2. The method of claim 1, wherein the first portion of the 3D representation is associated with a head and an upper portion of a torso of the second user.

3. The method of claim 1, wherein the second portion of the 3D representation is associated with at least a portion of one or two hands of the second user.

4. The method of claim 1, wherein:
   the camera viewpoint position is a viewpoint of a view provided by the second device comprising a 3D representation of the first user within a physical environment of the second device; and
   the eye viewpoint position is a viewpoint of an eye of the second user.

5. The method of claim 1, wherein adjusting a position of the portion of the 3D representation of the second user comprises:
   determining an initial position for the 3D representation based on a relationship between the first user and the 3D representation of the second user in the communication session; and
   moving the 3D representation from the initial position based on the offset.

6. The method of claim 5, wherein:
   the offset information comprises a vertical adjustment value; and
   the 3D representation is moved from the initial position based on the vertical adjustment value.

7. The method of claim 5, wherein:
   the offset information comprises a head tilt adjustment value; and
   the 3D representation is moved from the initial position based on the head tilt adjustment value.

8. The method of claim 1, wherein the offset information is determined based on sensor data.

9. The method of claim 1, wherein the offset information corresponds to an offset between a camera viewpoint position and an eye viewpoint position associated with the first device.

10. The method of claim 1, wherein the offset information is determined based on adjusting an anatomical position of a right eye and a left eye associated with the second user.

11. The method of claim 1, wherein the 3D environment comprises an extended reality (XR) environment based on passthrough video of a physical environment of the first device.

12. The method of claim 1, wherein the first device is located in a first physical environment and the second device is located in a second physical environment different than the first physical environment.

13. The method of claim 1, wherein the first device or the second device is a head-mounted device (HMD).

14. The method of claim 13, wherein the HMD comprises one or more inward facing image sensors and one or more outward facing image sensors.

15. The method of claim 14, wherein the sensor data obtained at the second device is captured by the one or more inward facing sensors and the one or more downward facing image sensors.

16. A first device associated with a first user, the first device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:

obtaining three-dimensional (3D) representation data corresponding to at least a portion of a second user of a second device during a communication session between the first device and the second device, the 3D representation data generated based on sensor data obtained at the second device;

obtaining offset information corresponding to an offset between a camera viewpoint position and an eye viewpoint position associated with the second device;

based on the 3D representation data and the offset information, adjusting a position of a first portion of a 3D representation of the second user relative to a 3D environment associated with the first device; and providing a view comprising the first portion and a second portion of the 3D representation of the second user in the 3D environment during the communication session, wherein a position of the second portion of the 3D representation of the second user is free from an adjustment relative to the 3D environment associated with the first device based on the 3D representation data and the offset information.

17. The first device of claim 16, wherein the first portion of the 3D representation is associated with a head and an upper portion of a torso of the second user.

18. The first device of claim 16, wherein the second portion of the 3D representation is associated with at least a portion of one or two hands of the second user.

19. The first device of claim 16, wherein:
the camera viewpoint position is a viewpoint of a view provided by the second device comprising a 3D representation of the first user within a physical environment of the second device; and
the eye viewpoint position is a viewpoint of an eye of the second user.

20. The first device of claim 16, wherein adjusting a position of the portion of the 3D representation of the second user comprises:
determining an initial position for the 3D representation based on a relationship between the first user and the 3D representation of the second user in the communication session; and
moving the 3D representation from the initial position based on the offset.

21. The first device of claim 20, wherein:
the offset information comprises a vertical adjustment value; and
the 3D representation is moved from the initial position based on the vertical adjustment value.

22. The first device of claim 20, wherein:
the offset information comprises a head tilt adjustment value; and
the 3D representation is moved from the initial position based on the head tilt adjustment value.

23. The first device of claim 16, wherein the offset information is determined based on sensor data.

24. The first device of claim 16, wherein the offset information corresponds to an offset between a camera viewpoint position and an eye viewpoint position associated with the first device.

25. A non-transitory computer-readable storage medium, storing program instructions executable on a first device including one or more processors to perform operations comprising:

obtaining three-dimensional (3D) representation data corresponding to at least a portion of a second user of a second device during a communication session between the first device and the second device, the 3D representation data generated based on sensor data obtained at the second device;

obtaining offset information corresponding to an offset between a camera viewpoint position and an eye viewpoint position associated with the second device;

based on the 3D representation data and the offset information, adjusting a position of a first portion of a 3D representation of the second user relative to a 3D environment associated with the first device; and providing a view comprising the first portion and a second portion of the 3D representation of the second user in the 3D environment during the communication session, wherein a position of the second portion of the 3D representation of the second user is free from an adjustment relative to the 3D environment associated with the first device based on the 3D representation data and the offset information.

* * * * *